(12) United States Patent
Back et al.

(10) Patent No.: US 11,903,084 B2
(45) Date of Patent: Feb. 13, 2024

(54) SIDELINK DISCOVERY-RELATED OPERATION METHOD IN WIRELESS COMMUNICATION SYSTEM

(71) Applicant: LG Electronics Inc., Seoul (KR)

(72) Inventors: Seoyoung Back, Seoul (KR); Giwon Park, Seoul (KR); Seungmin Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/159,423

(22) Filed: Jan. 25, 2023

(65) Prior Publication Data

US 2023/0164536 A1    May 25, 2023

Related U.S. Application Data

(63) Continuation of application No. PCT/KR2021/009774, filed on Jul. 28, 2021.

(60) Provisional application No. 63/062,370, filed on Aug. 6, 2020.

(30) Foreign Application Priority Data

| Jul. 28, 2020 | (KR) | 10-2020-0093762 |
| Jul. 28, 2020 | (KR) | 10-2020-0093777 |
| Aug. 4, 2020 | (KR) | 10-2020-0097179 |

(51) Int. Cl.
*H04W 4/00* (2018.01)
*H04W 8/00* (2009.01)
*H04W 80/02* (2009.01)

(52) U.S. Cl.
CPC ............ *H04W 8/005* (2013.01); *H04W 80/02* (2013.01)

(58) Field of Classification Search
CPC ..... H04W 8/005; H04W 80/02; H04W 88/04; H04W 4/40; H04W 72/0486; H04W 76/14; H04W 28/0231
USPC .......................................... 370/329
See application file for complete search history.

(56) References Cited

U.S. PATENT DOCUMENTS

| 10,149,280 | B2 * | 12/2018 | Baghel | H04W 72/04 |
| 10,327,252 | B2 * | 6/2019 | Byun | H04W 4/06 |
| 10,660,021 | B2 * | 5/2020 | Jung | H04W 24/10 |
| 11,533,735 | B1 * | 12/2022 | Vishwakarma | H04L 12/185 |
| 11,540,104 | B2 * | 12/2022 | Tabet | H04W 4/80 |
| 2006/0187858 | A1 * | 8/2006 | Kenichi | H04L 45/02 370/254 |
| 2015/0208384 | A1 * | 7/2015 | Baghel | H04W 72/04 455/450 |
| 2015/0281938 | A1 * | 10/2015 | Wei | H04W 8/005 370/254 |
| 2016/0295624 | A1 * | 10/2016 | Novlan | H04L 67/12 |

(Continued)

FOREIGN PATENT DOCUMENTS

WO    WO-2021136810 A1 *  7/2021  ........... H04W 76/14

*Primary Examiner* — Marceau Milord
(74) *Attorney, Agent, or Firm* — Fish & Richardson P.C.

(57) ABSTRACT

One embodiment is a sidelink discovery-related UE operation method in a wireless communication system, the operation method comprising the steps in which: the UE generates a discovery message; and the UE transmits the discovery message, wherein the discovery message is delivered to a Medium Access Control (MAC) layer through a logical channel (LCH), and the LCH has a fixed Logical Channel Identity (LCID) and a fixed priority for the discovery.

13 Claims, 20 Drawing Sheets

Generate discovery message — S1201

Transmit discovery message — S1202

(56) References Cited

U.S. PATENT DOCUMENTS

| | | | | |
|---|---|---|---|---|
| 2017/0257876 A1* | 9/2017 | Loehr | ................... | H04W 72/51 |
| 2018/0115882 A1* | 4/2018 | Adachi | ................ | H04W 72/02 |
| 2018/0295497 A1* | 10/2018 | Kim | ....................... | H04W 8/08 |
| 2019/0253867 A1* | 8/2019 | Abedini | .............. | H04J 13/0062 |
| 2019/0268748 A1* | 8/2019 | Abedini | .................. | H04W 4/46 |
| 2020/0153559 A1* | 5/2020 | Cheng | .................. | H04L 5/0053 |
| 2020/0178343 A1* | 6/2020 | Kim | ..................... | H04W 76/27 |
| 2021/0100027 A1* | 4/2021 | Xue | ..................... | H04W 52/365 |
| 2021/0153062 A1* | 5/2021 | Zhang | ................ | H04W 40/246 |
| 2021/0204098 A1* | 7/2021 | Raghavan | ............. | H04L 1/0041 |
| 2021/0320746 A1* | 10/2021 | Berger | ................. | H04L 1/0025 |
| 2022/0190886 A1* | 6/2022 | Islam | ............... | H04W 72/1268 |
| 2022/0264919 A1* | 8/2022 | Deng | .................... | A23B 4/033 |
| 2023/0054548 A1* | 2/2023 | Wang | ................... | H04B 7/0695 |
| 2023/0136005 A1* | 5/2023 | Back | .................... | H04W 76/11 |
| | | | | 370/329 |
| 2023/0217232 A1* | 7/2023 | Cheng | .................. | H04W 8/005 |
| | | | | 370/328 |
| 2023/0224951 A1* | 7/2023 | Back | .................... | H04W 92/18 |
| | | | | 370/329 |

* cited by examiner

SIDELINK DISCOVERY-RELATED OPERATION METHOD IN WIRELESS COMMUNICATION SYSTEM

CROSS-REFERENCE TO RELATED APPLICATIONS

This application is a continuation of International Application No. PCT/KR2021/009774, filed on Jul. 28, 2021, which claims the benefit of U.S. Provisional Application No. 63/062,370, filed on Aug. 6, 2020, Korean Application No. 10-2020-0097179, filed on Aug. 4, 2020, Korean Application No. 10-2020-0093777, filed on Jul. 28, 2020, and Korean Application No. 10-2020-0093762, filed on Jul. 28, 2020. The disclosures of the prior applications are incorporated by reference in their entirety.

TECHNICAL FIELD

The present disclosure relates to a wireless communication system, and more particularly, to a method and apparatus related to generation and priority of sidelink discovery messages.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

The object of embodiment(s) is to provide details related to discovery such as generation and priority of discovery messages In an aspect of the present disclosure, there is provided a method of operating a user equipment (UE) related to sidelink discovery in a wireless communication system. The method may include: generating, by the UE, a discovery message; and transmitting, by the UE, the discovery message. The discovery message may be delivered to a medium access control (MAC) layer over a logical channel (LCH), and the LCH may have a fixed logical channel identity (LCD) and a fixed priority for discovery.

In another aspect of the present disclosure, there is provided a UE in a wireless communication system. The UE may include: at least one processor; and at least one computer memory operably connectable to the at least one processor and configured to store instructions that, when executed, cause the at least one processor to perform operations. The operations may include: generating, by the UE, a discovery message; and transmitting, by the UE, the discovery message. The discovery message may be delivered to a MAC layer over an LCH, and the LCH may have a fixed LCID and a fixed priority for discovery.

In another aspect of the present disclosure, there is provided a processor configured to perform operations for a UE. The operations may include: generating, by the UE, a discovery message; and transmitting, by the UE, the discovery message. The discovery message may be delivered to a MAC layer over an LCH, and the LCH may have a fixed LCID and a fixed priority for discovery.

In a further aspect of the present disclosure, there is provided a non-volatile computer-readable storage medium configured to store at least one computer program including instructions that, when executed by at least one processor, cause the at least one processor to perform operations for a relay UE. The operations may include: generating, by a UE, a discovery message; and transmitting, by the UE, the discovery message. The discovery message may be delivered to a MAC layer over an LCH, and the LCH may have a fixed LCID and a fixed priority for discovery.

The fixed priority may have a constant value regardless of whether the UE is a relay UE or a remote UE, a change in a service type, a change in a congestion level, and a change in a zone.

The discovery message may not be multiplexed with data for a different service or a different channel, except for data related to a radio resource control (RRC) connection.

A pre-emption priority threshold of the discovery message may have a unique value, The UE may be configured to request a remote UE to exclude a resource region related to reception of the discovery message from candidate transmission resources.

The discovery message may be a response to a solicitation discovery message received from a remote UE.

Sidelink control information (SCI) transmitted by the UE may include a discovery message indicator indicating that a MAC protocol data unit (PDU) is related to the discovery message.

The discovery message indicator may include information indicating that the message is to discover a relay UE.

The information may be 2-bit information indicating that the discovery message indicator is any one of a Model A discovery message, a Model B solicitation message, and a Model B discovery message.

The UE may be configured to communicate with at least one of another UE, a UE related to an autonomous vehicle, a base station, or a network.

According to an embodiment, a discovery procedure may be efficiently performed even when there is no separate discovery channel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "AB/C" may mean "at least one of A, B and/or C". Further, "A, B, C" may mean "at least one of A, B and/or C".

In various embodiments of the present disclosure, "or" should be interpreted as "and/or". For example, "A or B"

may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
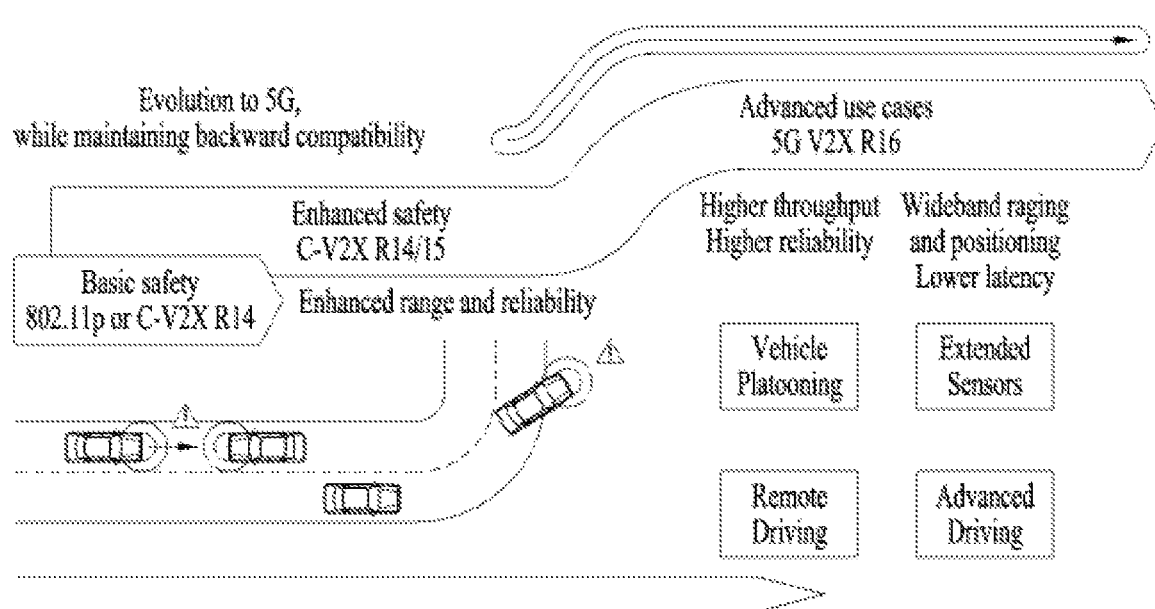
FIG. 1 is a diagram comparing vehicle-to-everything (V2X) communication based on pre-new radio access technology (pre-NR) with V2X communication based on NR.
Figure 2:
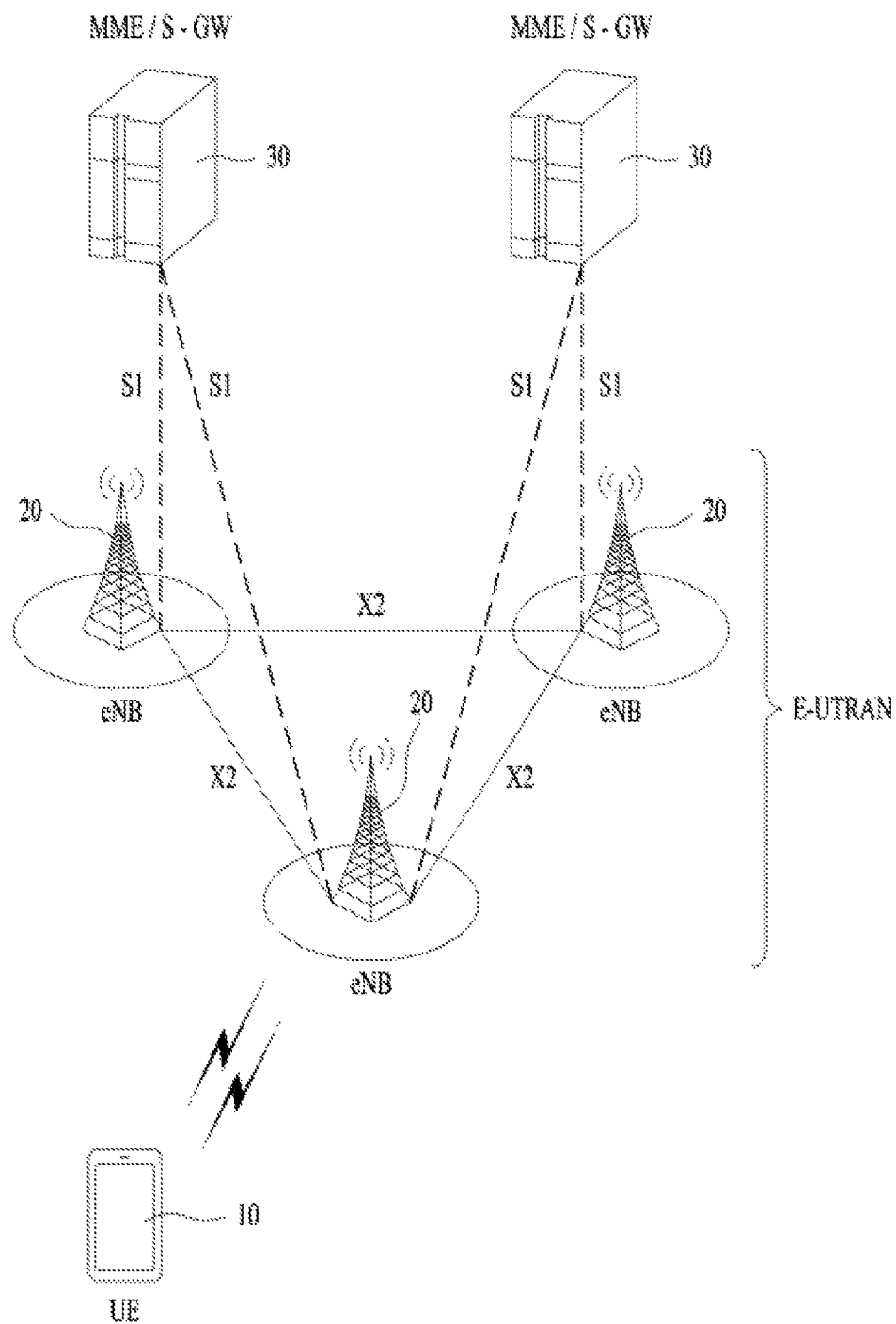
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3B:
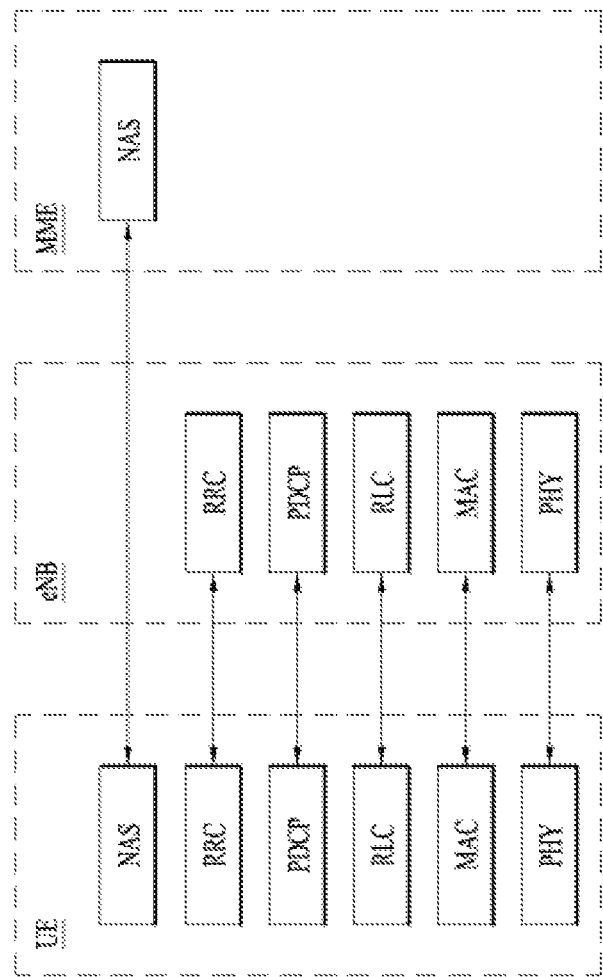
FIGS. 3A and 3B are diagrams illustrating user-plane and control-plane radio protocol architectures according to an embodiment of the present disclosure.
Figure 3A:
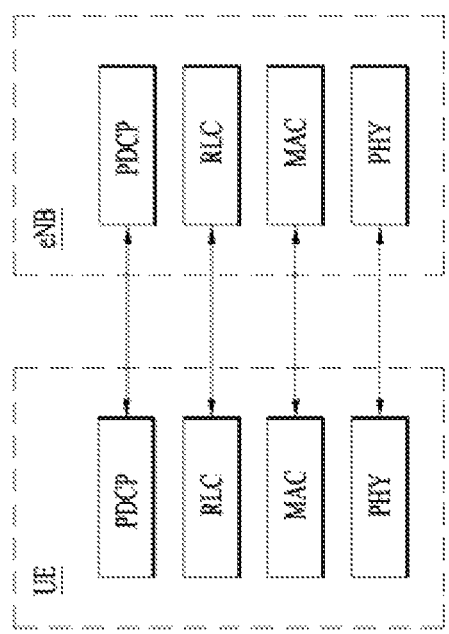

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and 3B, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_DLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
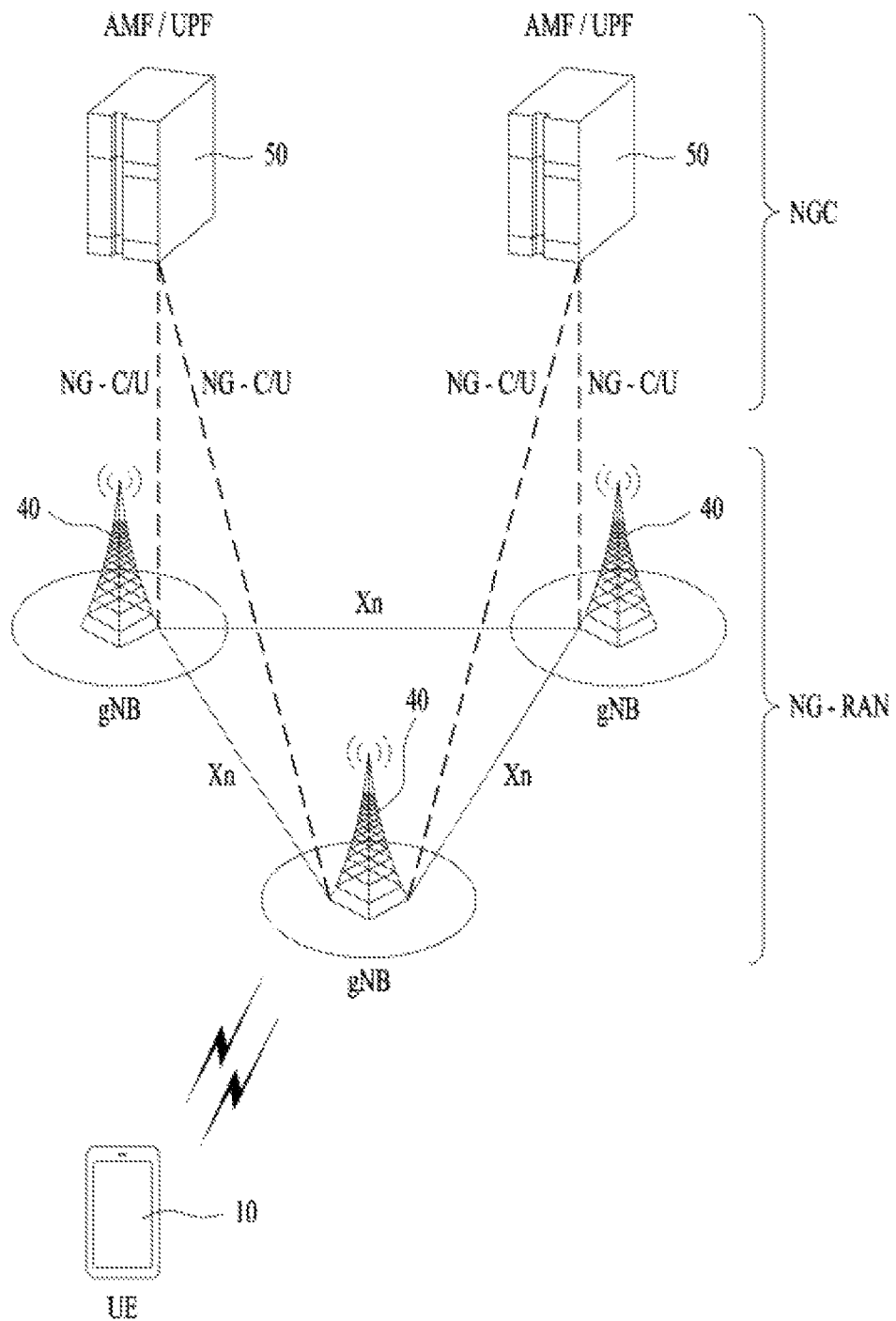
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
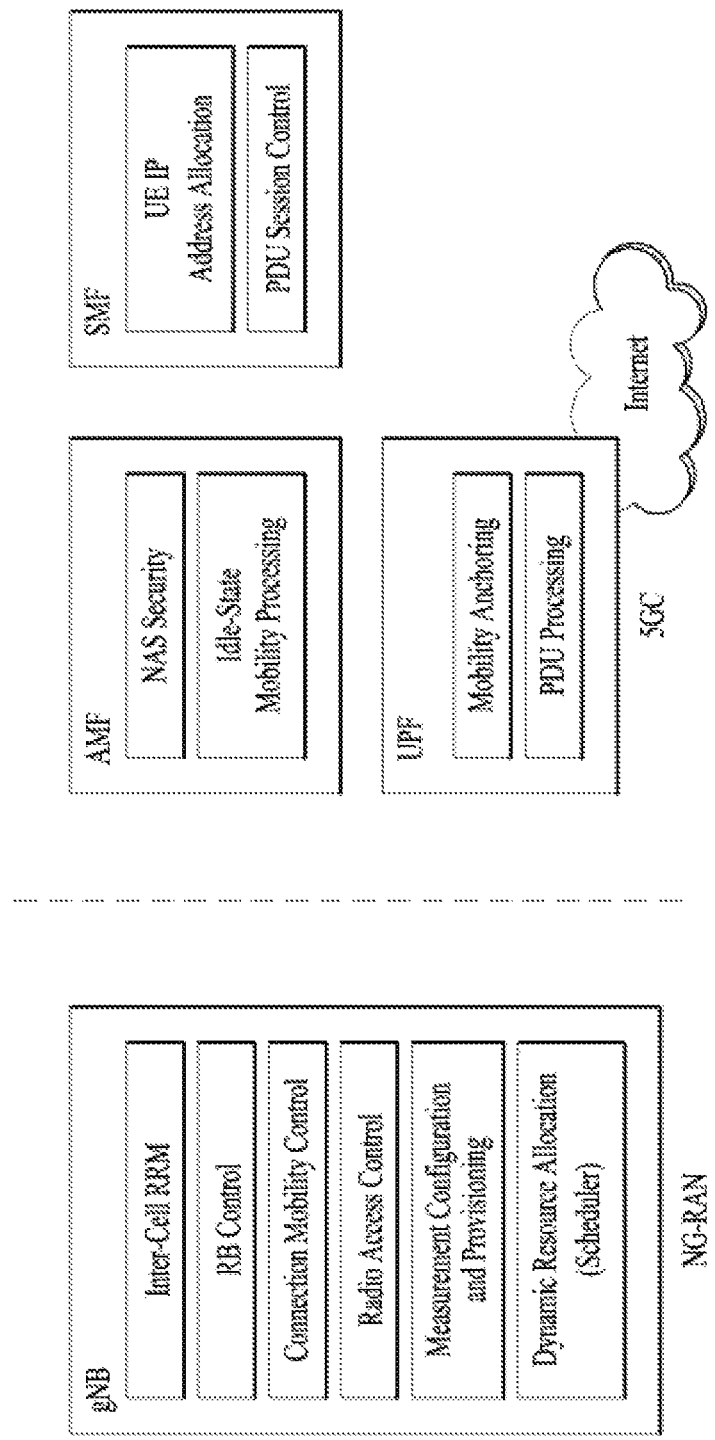
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
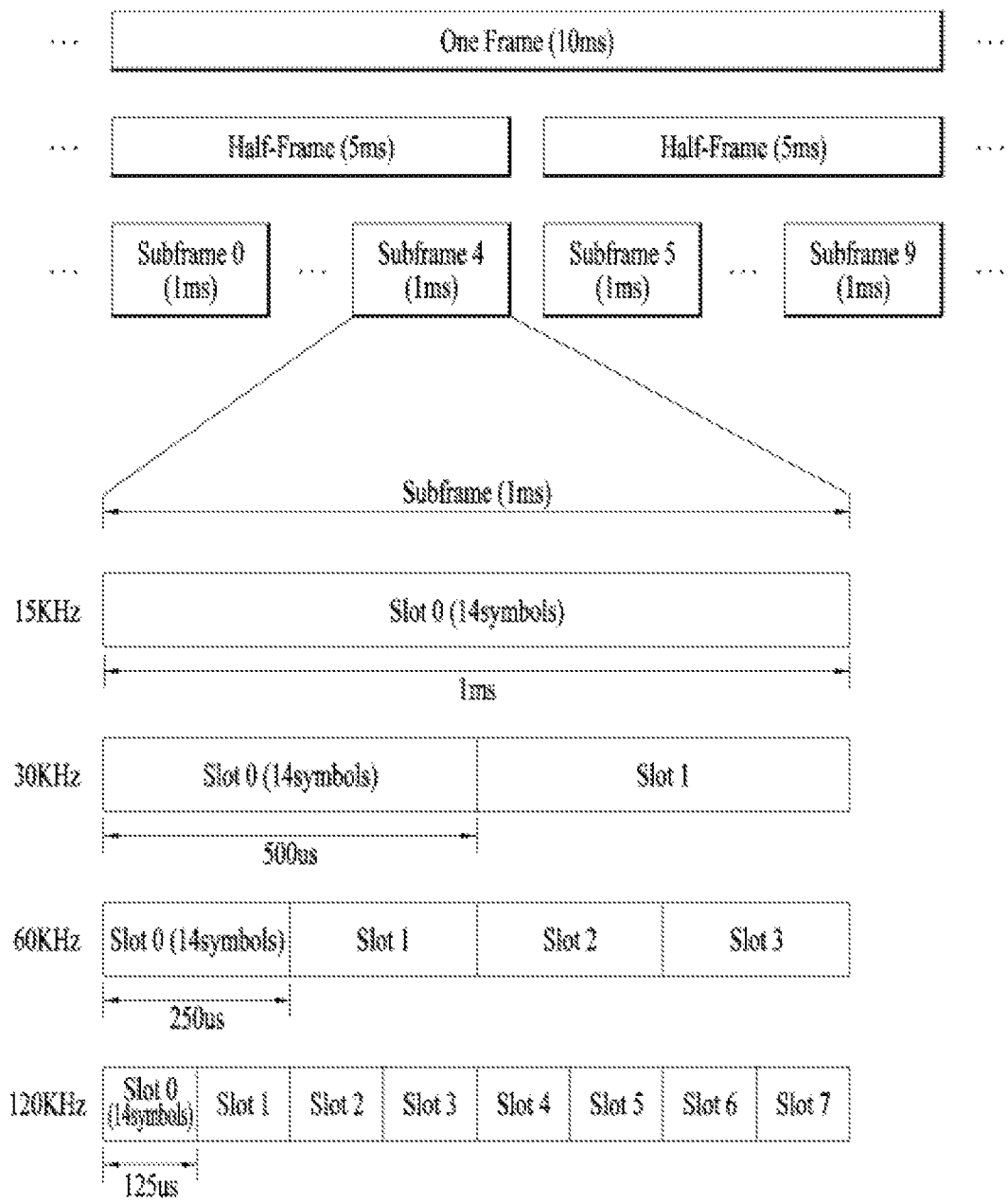
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS(15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS(15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
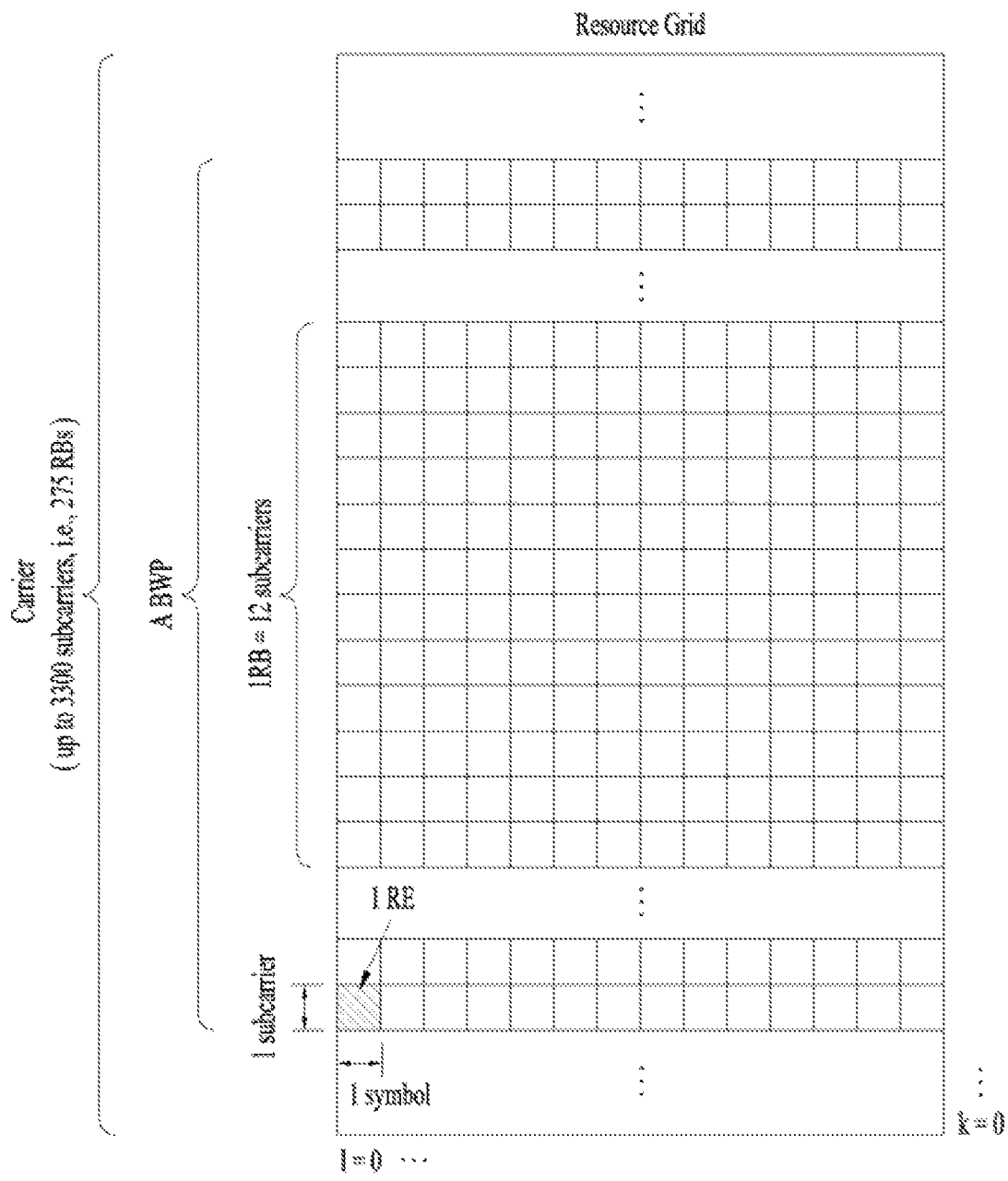
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8A:
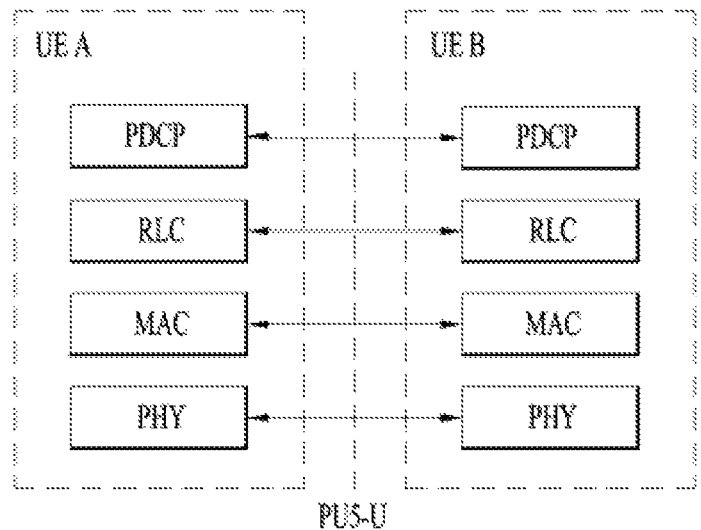
FIGS. 8A and 8B are diagrams illustrating radio protocol architectures for sidelink (SL) communication according to an embodiment of the present disclosure.
Figure 8B:
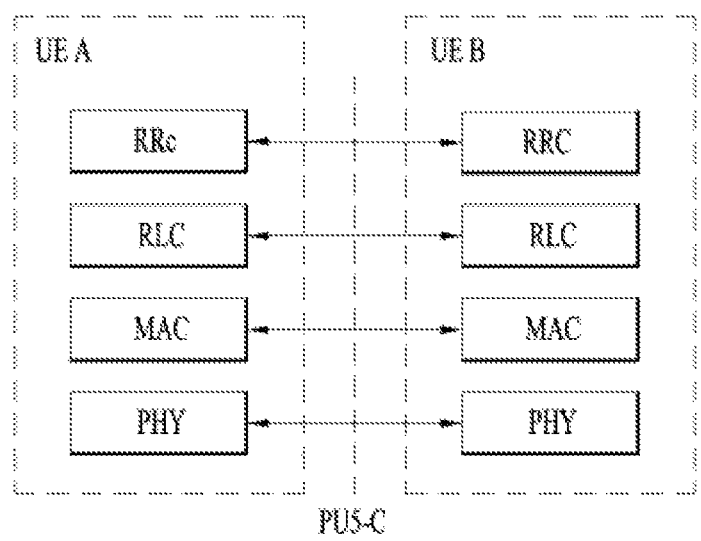

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
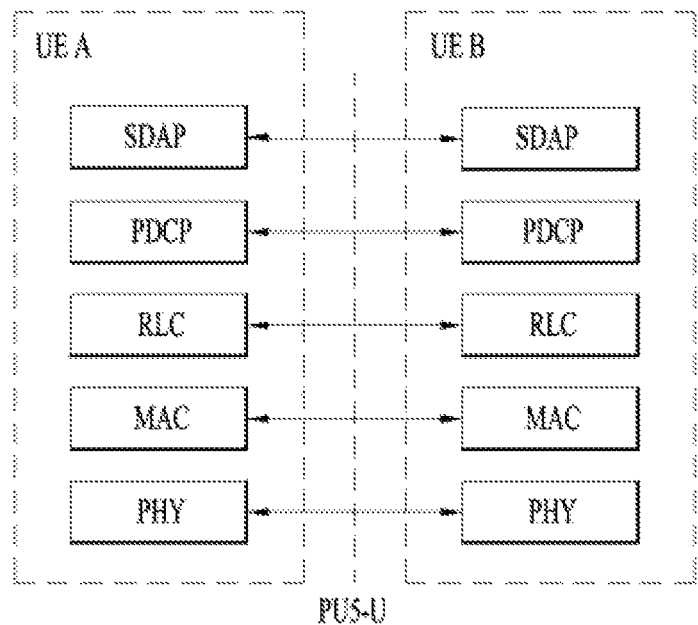
FIGS. 9A and 9B are diagrams illustrating radio protocol architectures for SL communication according to an embodiment of the present disclosure.
Figure 9B:
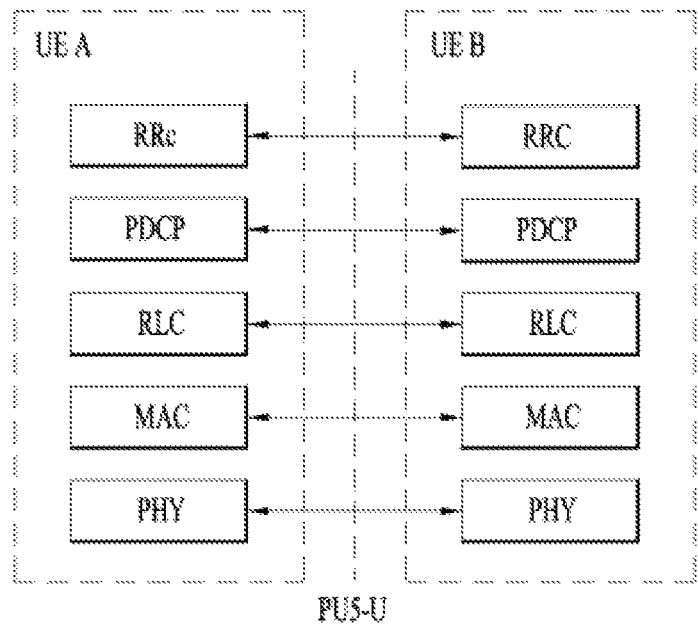

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR.

Resource allocation in SL will be described below.

Figure 10A:
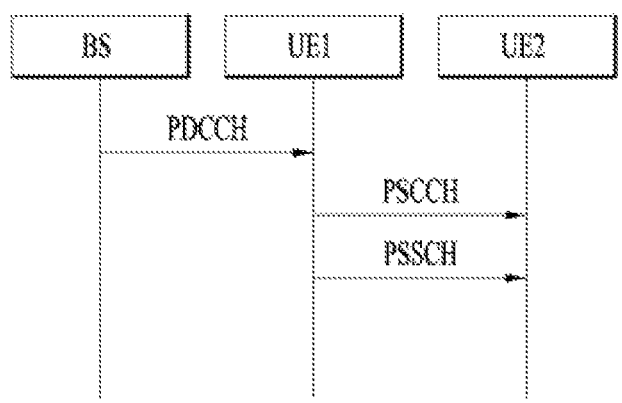
FIGS. 10A and 10B illustrate a procedure in which a UE performs V2X or SL communication according to a transmission mode according to an embodiment of the present disclosure.
Figure 10B:
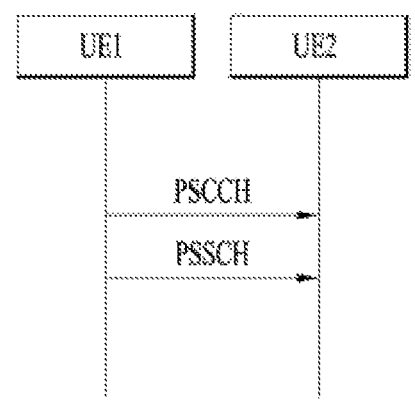

FIGS. 10A and 10B illustrate a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10A illustrates a UE operation related to LTE transmission mode 1 or LTE transmission mode 3. Alternatively, for example, FIG. 10A illustrates a UE operation related to NR resource allocation mode 1. For example, LTE transmission mode 1 may be applied to general SL communication, and LTE transmission mode 3 may be applied to V2X communication.

For example, FIG. 10B illustrates a UE operation related to LTE transmission mode 2 or LTE transmission mode 4. Alternatively, for example, FIG. 10B illustrates a UE operation related to NR resource allocation mode 2.

Referring to FIG. 10A, in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10B, in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
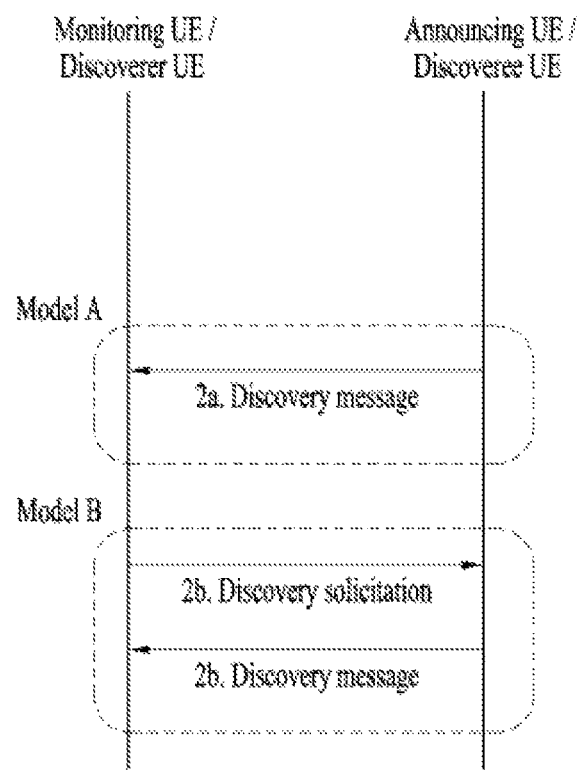
FIGS. 11 to 13 are diagrams for explaining embodiment(s)

For SL communication, a discovery message may be used to establish a connection with a neighboring UE. Discovery messages may be divided into Model A and Model B as illustrated in FIG. 11. In Model A, an announcing UE continuously broadcasts a discovery message, and a monitoring UE hears the discovery message. In Model B, a discoverer UE broadcasts a discovery solicitation message, and upon hearing the discovery solicitation message, a discoveree UE transmits a discovery message.

Figure 12:
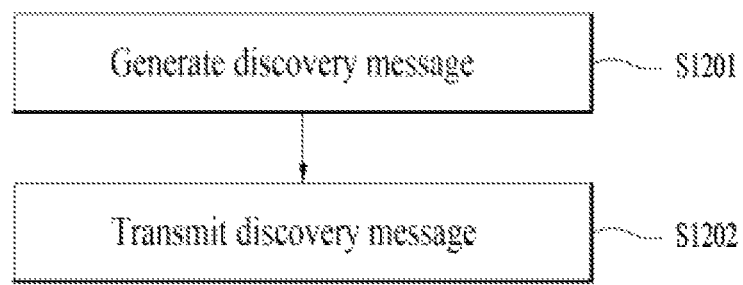

FIG. 12 illustrates basic relationships of UE-to-Network Relay and UE-to-UE Relay. Regarding relay operation, two UEs may discover each other as follows. In UE-to-Network Relay, a relay UE may have a connection with a gNB, and the relay UE may be in coverage or out of coverage. If the relay UE broadcasts a discovery message (periodically), a remote UE may hear the discovery message (Model A). If the remote UE broadcasts a solicitation message, the relay UE may broadcast/groupcast/unicast a discovery message in response to the solicitation message (Model B).

The discovery message may include the contents shown in Table 5 below. Details thereof may be found in TR 23.752.

TABLE 5 a) Application ID: An identity used by a UE to indicate a specific ProSe application. The ProSe application ID is assigned (provided) by the ProSe application layer and can be used to identify e.g.:
- An application e.g. Mission Critical Voice, Game A, Game B, Taxi Communications company Y
b) Destination Layer-2 ID Indicate:
- A specific target UE layer-2 ID or layer-2 ID for initial signalling.
c) Source Layer-2 ID that is set to a unicast identifier of the transmitter.
d) Source UE's ProSe Application Layer ID. An identity used to identify the source ProSe UE at the application layer. It is provided by the ProSe Application Layer to the ProSe Layer.
e) Target UE's ProSe Application Layer ID. An identity used to identify the destination ProSe UE at the application layer. It is provided by the ProSe Application Layer to the ProSe Layer.
f) ProSe Application Layer Group ID. An identity used to identify a application layer group the UE belongs to.
g) Relay Service Code (for UE-to-Network Relay Discovery):
- Relay Service Code as defined in TS 23.303 [9].
h) Discovery Group ID (for Group Member Discovery):
- Discovery Group ID as defined in TS 23.303 [9].
    All of the above identities can be either fixed over time or can be dynamic depending on operator configuration. When an identity is dynamic it will have a validity timer. Dynamic allocation of the identities by the ProSe Application layer allows for privacy support.

In conventional LTE, a discovery message and a discovery channel have been defined for D2D communication. On the other hand, there are no discovery channels in 5G NR. However, a discovery message similar to the conventional one is required for relay operation, and an SL discovery message suitable for 5G NR physical layer operations is required. Hereinafter, several proposals related to SL discovery messages will be described based on discovery of conventional LTE and/or 5G NR (physical layer). In this document, a discovery message may mean any one of a discovery message, a discovery solicitation message, and a discovery response message. Alternatively, the discovery message may collectively mean these messages.

According to an embodiment, the UE may generate a discovery message (S1201 of FIG. 12) and transmit the discovery message (S1202 of FIG. 12).

The discovery message may be delivered to a MAC layer over a logical channel (LCH), and the LCH may have a fixed logical channel identity (LCD) and a fixed priority for discovery. When the LCH has the fixed LCID and fixed priority for discovery, there is an advantage in that a receiving UE is capable of recognizing at layer 2 (MAC layer) that the corresponding fixed LCID and fixed priority are for the discovery message even though the discovery message is not separately indicated. Alternatively, if the receiving UE is not interested in the discovery message, the receiving UE may not decode the corresponding fixed LCID and fixed priority. Specifically, the discovery message may be generated at a higher layer (application layer) and delivered to the MAC Layer. In this case, the LCID for transmitting the discovery message may be determined to have a fixed value. In addition, for the discovery message (and/or corresponding LCID), a fixed priority value may be allocated in advance or configured by the network. Additionally/alternatively, the priority value may be set to a fixed value defined in specifications (L1 priority).

The fixed priority may have the same value, regardless of whether the UE is a relay UE or a remote UE, a change in the service type, a change in the congestion level, and a change in the zone.

The discovery message may not be multiplexed with data for a different service or a different channel, except for RRC connection related data. That is, the discovery message may be configured not to be multiplexed (MUXed) with other services/channel data. Exceptionally, it may be allowed that discovery data is MUXed with data used for establishing a (RRC) connection (for example, linked status) (which is performed after completion of the discovery procedure). The reason for this is to complete a communication connection quickly.

Figure 13:
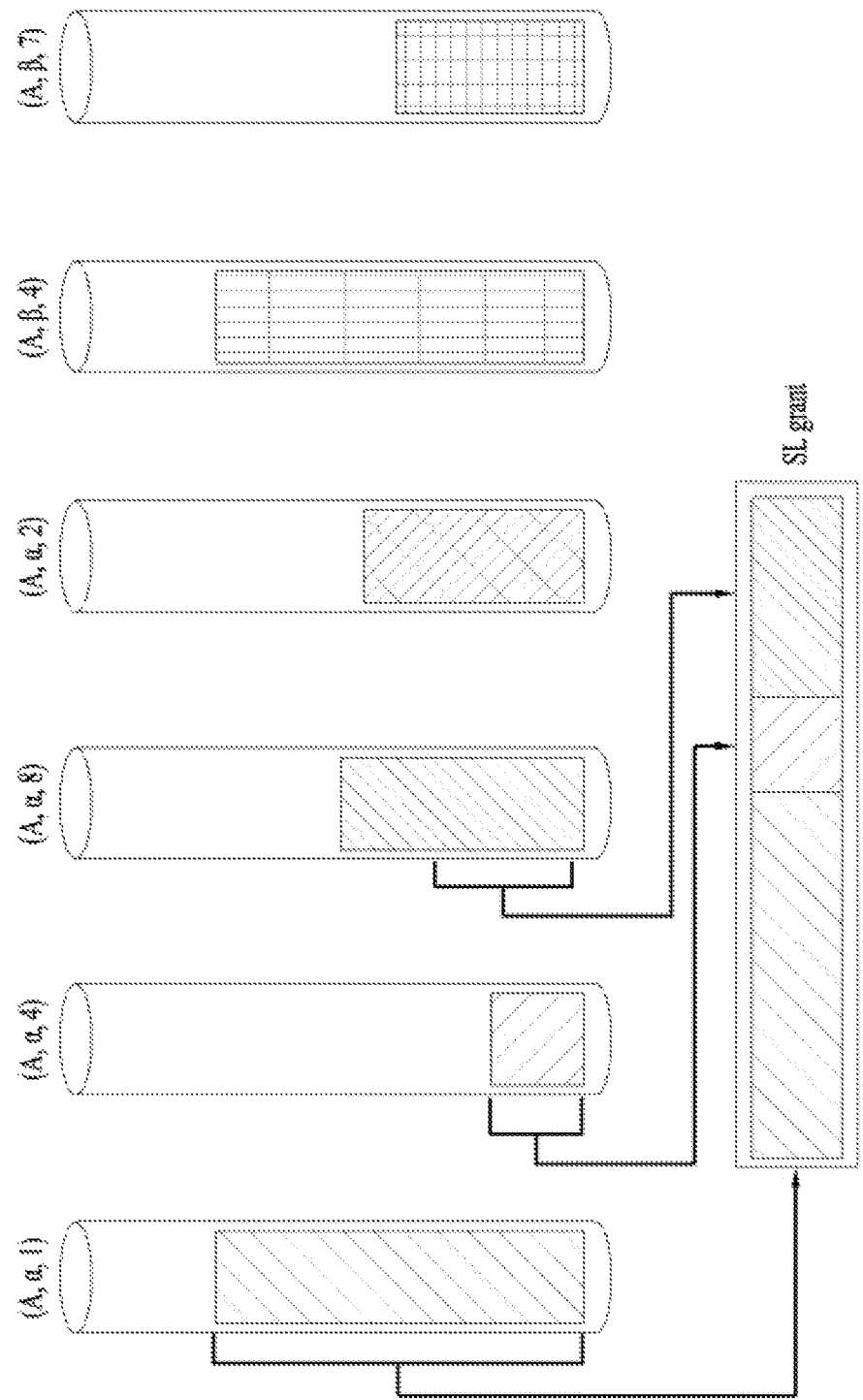

For the same broadcast type and the same destination, a MAC PDU for current transmission may be determined according to a priority rule. In the following operation, it is assumed that a dedicated MAC PDU for a discovery message is determined. For example, assuming that an LCH is configured as illustrated in FIG. 13, a first LCH (i.e., (A, a, 1)) may be an LCH for a discovery channel, a second LCH (i.e., (A, a, 4)) may be an LCH for PC5-S, and a third LCH (i.e., (A, a, 8)) may be an LCH for SL RRC. The broadcast type may be unicast, broadcast, or groupcast. According to an embodiment, when the first LCH (i.e., (A, a, 1)) is the discovery channel and when a transmission TB is configured by including the corresponding LCH, even if a fourth LCH (i.e., (A, a, 2)) has a higher priority, the same cast type, and the same destination, the fourth LCH may not be MUXed with the discovery channel. In this case, the fourth LCH may be a message for general communication.

The remote UE may determine a candidate relay UE to establish a connection with by measuring RSRP of an SL signal (or a resource related to the discovery message) broadcast by the relay UE. In this case, to improve the accuracy of the RSRP measurement, not only the discovery message but also a DMRS related to subsequent communication data may be used for the SL RSRP measurement.

To protect/prioritize the discovery message, a pre-emption priority threshold (or a (PSCCH and/or PSSCH) DMRS RSRP threshold used for resource sensing/excluding for selecting/reserving resources for transmission of the discovery message) may be configured independently of other (general) SL messages, where the pre-emption priority threshold is related to the discovery message and has a unique value. For example, the pre-emption priority threshold related to the discovery message may be set to a relatively lower priority value, and/or for the same priority, the DMRS RSRP threshold may be set to a relatively higher value. In this case, the lower the 'priority value' mentioned above, the higher the priority.

The UE may request the remote UE to exclude a resource region related to reception of the discovery message from candidate transmission resources. In this case, the discovery message may be a response to a solicitation discovery message received from the remote UE. Specifically, the UE may request the UE (i.e., remote UE) that has transmitted the solicitation discovery message to exclude (time/frequency) resources in the (time/frequency) resource region where the reception of the (associated) response discovery message is expected from a set of candidate transmission resources available for selection/reservation. In particular, the above operation is useful when a linkage is established between solicitation discovery message resources and response discovery message resources within a resource pool. By doing so, the probability of missing the response discovery message may be reduced.

On the other hand, discovery related (L1 and/or LCH) priorities may vary depending on the UE type (e.g., relay UE, remote UE, etc.), service type, and/or congestion level. Also, these values may vary depending on the zone. Particularly, the following may be applied. Any one of the following descriptions/applications may be used independently or in combination.

The priority of the discovery message, discovery solicitation message, or discovery response message related to the remote UE may have a relatively higher value than the priority of the discovery message of the relay UE. Accordingly, when there is a limitation that the remote UE needs to operate with relatively low power compared to the relay UE, the power saving effect of the remote UE may be maximized.

For example, a discovery message may have a specific range of values, instead of being configured with a fixed value. Alternatively, the priority of the discovery message may be relatively determined according to the priority of a service to be relayed. If the priority of a discovery message transmitted by the remote UE is '3', the priority value of a discovery message that a candidate relay UE is capable of transmitting in response to the discovery message may be set equal to or greater than '3' (in this case, the smaller the priority value, the higher the priority). Since the remote UE may be a UE requiring low-power operation, the remote UE may perform transmission with a large period value/high priority (=low priority value). On the other hand, since the relay UE may be a UE requiring relatively low-power operation, the relay UE may transmit a discovery message with a small period value/low priority (=high priority value), thereby assisting the power saving effect of (other neighboring) low-power remote UEs.

The priority of a public safety discovery message may have a higher value than the priority of a commercial service related discovery message. For example, when the priority value of a discovery message transmitted for public safety is set to '2', if a neighboring remote/relay UE transmits a discovery message for commercial messages upon receiving the discovery message, the selection range of the priority value of the discovery message for commercial messages may be limited such that the priority value of the discovery message for commercial messages is set larger than the priority value of the discovery message for safety messages, for example, '3' or '4'.

When the congestion level is high, the discovery message priority may be set to be relatively high. The reason for this is to guarantee and protect discovery message transmission opportunities even when the congestion level is high.

The discovery priority may be considered/configured between PC5-RRC/PC5-S and an SL data LCH in terms of SL logical channel prioritization (LCP) operation.

Since the (relay) discovery message is used for SL measurement and/or relay UE (re-)selection between the relay UE and the remote UE, the (relay) discovery message may have a higher priority than other data (e.g., SL communication data, UL data, etc.). For example, information on a time (frequency) region where the (relay) discovery message is considered to have a relatively high priority may be configured through predefined signaling (e.g., configuration (or preconfiguration), PC5-RRC, etc.). The priority of the (relay) discovery message may vary depending on the (related) service type (e.g., commercial, public safety, etc.), UE type (e.g., relay UE, remote UE, etc.), congestion level, and/or discovery related to relaying operation.

SCI transmitted by the UE may include a discovery message indicator indicating that a MAC PDU is related to a discovery message. As described above, the content of the discovery message may include information that needs to be reported for direct communication. In the prior art, since a discovery message is transmitted over a discovery channel, desired information could be obtained by decoding the discovery channel. However, when the content of a discovery message is transmitted over a PSSCH, the UE may not know whether the message received by the UE is the discovery message until the UE decodes the corresponding message and checks the content. Thus, an indication indicating the discovery message is included and transmitted in the SCI. When the discovery message is delivered to the physical layer, the physical layer may be informed that the corresponding MAC PDU is related to the discovery message. When the transmitted MAC PDU is related to the discovery message, the physical layer may indicate that the MAC PDU is related to the discovery message in the SCI.

When the discovery message is delivered to the physical layer, the physical layer may be informed that the corresponding MAC PDU is related to the discovery message. The physical layer may inform that the MAC PDU is related to the discovery message in the SCI (discovery message indicator). When the discovery message indicator is indicated by the SCI, it may have the following advantages.

First, when the receiving UE desires to establish an SL connection, if there are messages with the same priority, the receiving UE may identify the discovery message and decode the discovery message first.

Second, when the UE desires to receive the discovery message for relay communication or direct connection, the UE may be configured (or preconfigured) to establish a connection only with UEs whose RSRP values are higher than a predetermined threshold. In this case, after checking the discovery message indication in the SCI, the receiving UE may measure RSRP based on the value of a DMRS on a PSCCH/PSSCH. The UE may perform decoding only when the measured RSRP value exceeds the predetermined threshold. By doing so, it is possible to avoid decoding the discovery message when the RSRP value does not exceed the predetermined threshold. In this case, the configured (or preconfigured) RSRP threshold may vary for each service, which may be predetermined through higher/physical layer signaling.

Third, when the UE is interested in the discovery operation (e.g., when the UE desires to perform the relay operation), the UE may select and decode the discovery message from among various broadcasted information. On the other hand, when the UE is not interested in the discovery operation, the UE may not intentionally select the discovery message from among various broadcast information.

The information may be 2-bit information indicating that the discovery message indicator is any one of a Model A discovery message, a Model B solicitation message, and a Model B discovery message. Specifically, the discovery message indicator may indicate that the discovery message is for direct connection, but the discovery message indicator may indicate that the discovery message is for indirect connection to find the relay UE in UE-to-Network Relay and UE-to-UE Relay operations. To distinguish whether the discovery message is for direct connection or indirect connection, a 2-bit indicator may be added to the SCI. In this case, the 2-bit indicator may include the contents shown in Table 6 below. The bit values in the table below are exemplary, that is, other values may be used, and the relationship between the bit values and meanings may also be changed.

TABLE 6

| Discovery indication in SCI | Meaning |
| --- | --- |
| 00 | Model A discovery message |
| 01 | Model B solicitation message |
| 10 | Model B discovery message |

For the discovery indicator, reserved bit(s) in first SCI on a PSCCH may be configured. Additionally/alternatively, the discovery indicator may be represented by a preconfigured second SCI format. Also, if all discovery information is capable of being transmitted in the second (and/or first) SCI, a dummy (with preconfigured bit values) may be transmitted over an associated/related PSSCH, and/or the corresponding PSSCH may be all occupied by the second SCI. In this case, for example, a different ID value may be designated for each service (e.g., commercial, public safety, etc.) and/or UE type (e.g., relay UE, remote UE, etc.).

When the physical layer checks the discovery indicator in the SCI, the physical layer may measure signal strength (e.g., RSRP) to select the relay UE. In this case, the DMRS may be used to measure the RSRP value. Only the DMRS of the PSCCH or PSSCH may be used as the DMRS for measuring the RSRP of the discovery message. Alternatively, both the DMRSs of the PSCCH and PSSCH may be configured to be used in order to improve the accuracy based on an increase in the number of measurement samples. For reference, in REL-16, either the PSCCH DMRS or PSSCH DMRS may be configured to be used for measurement.

To select a relay and/or discover a peer UE for direct communication, the UE may measure the RSRP of the discovery message. Only when the measured value exceeds a predetermined threshold, the UE may consider it as a candidate relay UE. In this case, the discovery message reflected in the discovery RSRP measurement may be limited in the following cases: when the discovery message is successfully decoded (e.g., when either or both of the PSSCH and PSCCH are successfully decoded), when services of interest are provided, and/or when the discovery is target UE related discovery (e.g., in this case, L2 ID decoding may be interpreted to be successful). That is, it may be interpreted that only when L1 ID decoding is successful, it may not be reflected in the discovery message RSRP measurement.

If the source/destination ID (of L1 and/or L2) is designated as a specific preconfigured value instead of the discovery message indicator used for the SCI, it may also be interpreted as the discovery message indicator. In this case, a different source/destination ID value may be designated for each service (e.g., commercial, public safety, etc.) and/or UE type (e.g., remote UE, relay UE, etc.).

Alternatively, the source/destination ID (of L1 and/or L2) is designated as a specific preconfigured value, together with the discovery message indicator used for the SCI, in order to indicate whether the corresponding message is the discovery message and allow to search for a service targeted by the corresponding discovery message (e.g., commercial, public safety, etc.). For example, for discovery model A, the 'Model A discovery message' may be provided in the SCI, and a supportable service may be informed by the destination ID. In this case, the destination ID needs to have a preconfigured value to be used for a specific service. Similarly, for the Model B solicitation message, the 'Model B solicitation message' may be provided in the SCI, and the solicitation message may be broadcast based on the destination ID value assigned to the specific service that the UE desires to search for.

If the size of the discovery message is fixed or has a small variation, a mode 1 UE may be configured to perform SR transmission without buffer status report (BSR) triggering. That is, the discovery message may be transmitted, similarly to CSI or MAC CE transmission in SL. For example, the above-described discovery-related SR transmission may be configured independently of and/or separately from other information, for example, SR resources such as SL CSI and SL DATA. In addition, if the size of the discovery message varies depending on the service type (e.g., commercial, public safety, etc.) and/or UE type (e.g., relay UE, remote UE, etc.), different SR resources may also be configured for each service and/or UE type. The related information may be configured or pre-configured through RRC (or physical layer) signaling.

When the relay UE broadcasts the discovery message, the relay UE may include and transmit latency budget information in the discovery message. In this case, the latency budget information may be configured (or preconfigured) depending on the resource pool (service priority/type and/or discovery type). When the latency budget information is transmitted and included (implicitly), the power saving effect of the relay UE may be obtained. If there is no response within the latency budget included in the discovery message, the frequency of broadcasting the discovery message may be reduced, thereby maximizing the power saving effect (for the discovery model A operation).

The remote UE may provide latency budget information related to discovery response message reception to the relay UE through predefined signaling (e.g., PC5, RRC, etc.). When the latency budget information is transmitted, the power saving effect of the remote UE may be obtained. In this case, for example, if the remote UE does not receive the discovery response message within the latency budget, the remote UE may retransmit the discovery solicitation message (a predetermined number of times). For example, if existing mode 1 resources do not satisfy the latency budget related to the transmission of the discovery response message, SR transmission may be triggered for new discovery resource allocation. In this case, the latency budget may be configured independently for each service (for the discovery model B operation)

The above-described signals required when a discovery message is transmitted over a PSCCH/PSSCH and operation methods therefor may be applied to both communication for direct connection and communication for relaying. The signals and operation methods are also applicable to both UE-to-Network Relay and UE-to-UE Relay. In addition, the details of indirect connection through relaying have been described separately, but it is apparent that the details are applicable to direct connection. In the above description, a high priority means a low priority value. That is, the lower the priority value, the higher the priority.

Based on the above description, a UE is provided. The UE may include: at least one processor; and at least one computer memory operably connectable to the at least one processor and configured to store instructions that, when executed, cause the at least one processor to perform operations. The operations may include: generating, by the UE, a discovery message; and transmitting, by the UE, the discovery message. The discovery message may be delivered to a MAC layer over an LCH, and the LCH may have a fixed LCD and a fixed priority for discovery.

There is provided a processor configured to perform operations for a UE. The operations may include: generating, by the UE, a discovery message; and transmitting, by the UE, the discovery message. The discovery message may be delivered to a MAC layer over an LCH, and the LCH may have a fixed LCD and a fixed priority for discovery.

In addition, there is provided a non-volatile computer-readable storage medium configured to store at least one computer program including instructions that, when executed by at least one processor, cause the at least one processor to perform operations for a relay UE. The operations may include: generating, by a UE, a discovery message; and transmitting, by the UE, the discovery message. The discovery message may be delivered to a MAC layer over an LCH, and the LCH may have a fixed LCD and a fixed priority for discovery.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
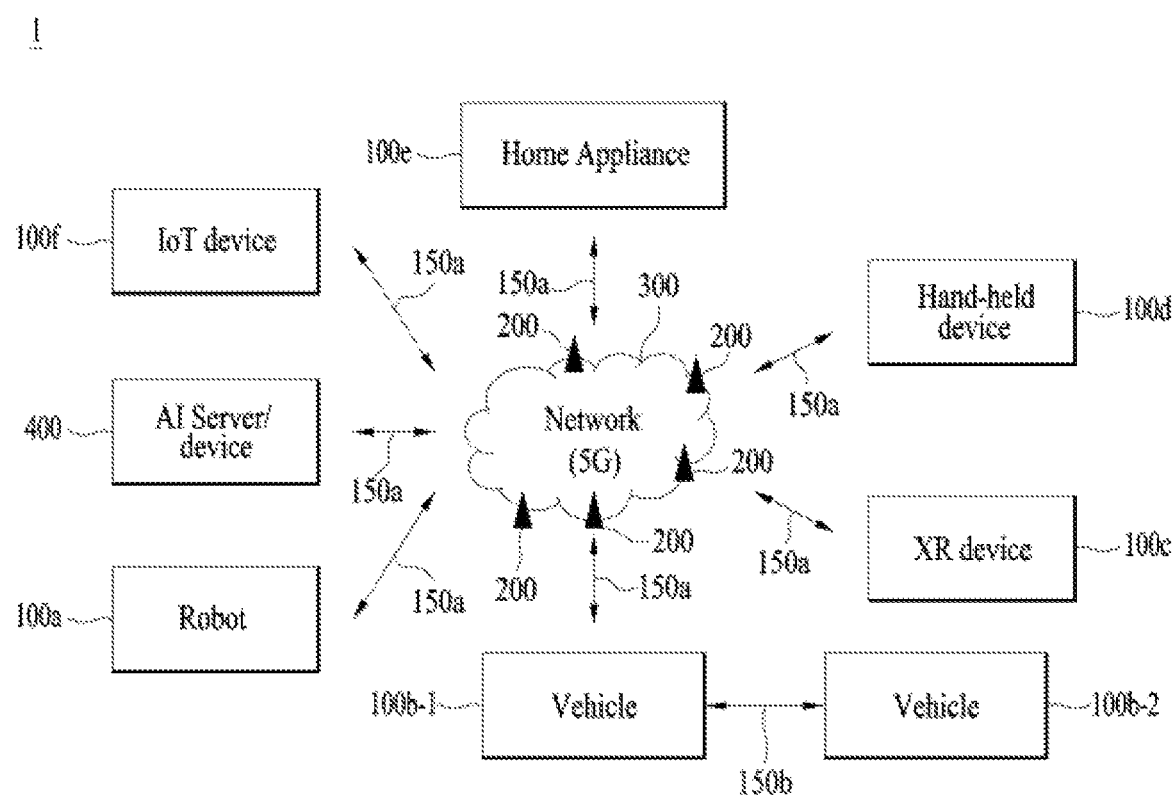
FIGS. 14 to 20 are diagrams for explaining various devices to which embodiment(s) are applicable.

FIG. 14 illustrates a communication system 1 applied to the present disclosure.

Referring to FIG. 14, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 15:
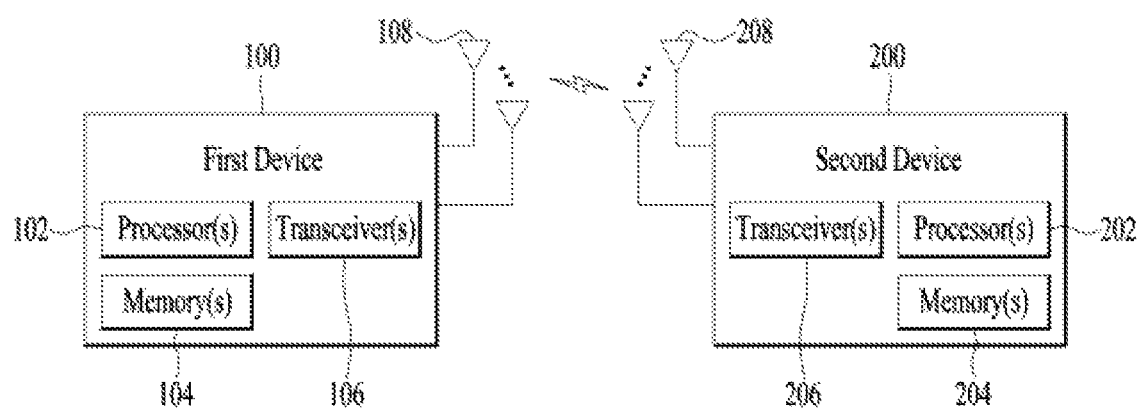

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
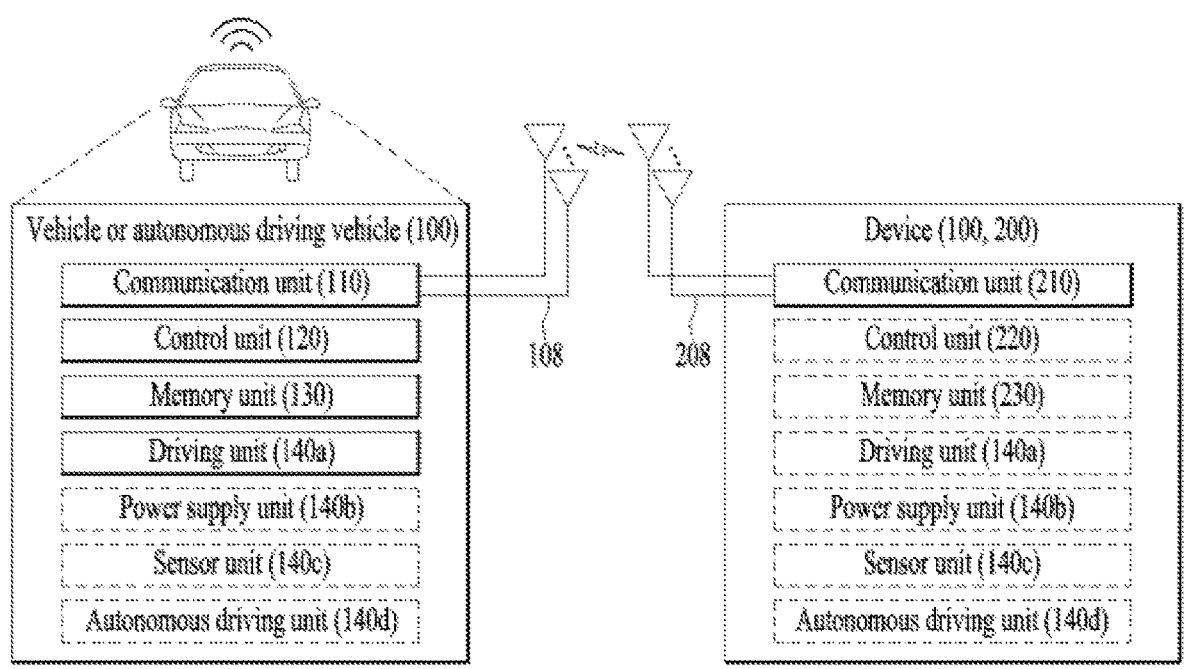

Examples of a vehicle or an autonomous driving vehicle applicable to the present disclosure FIG. 16 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 17:
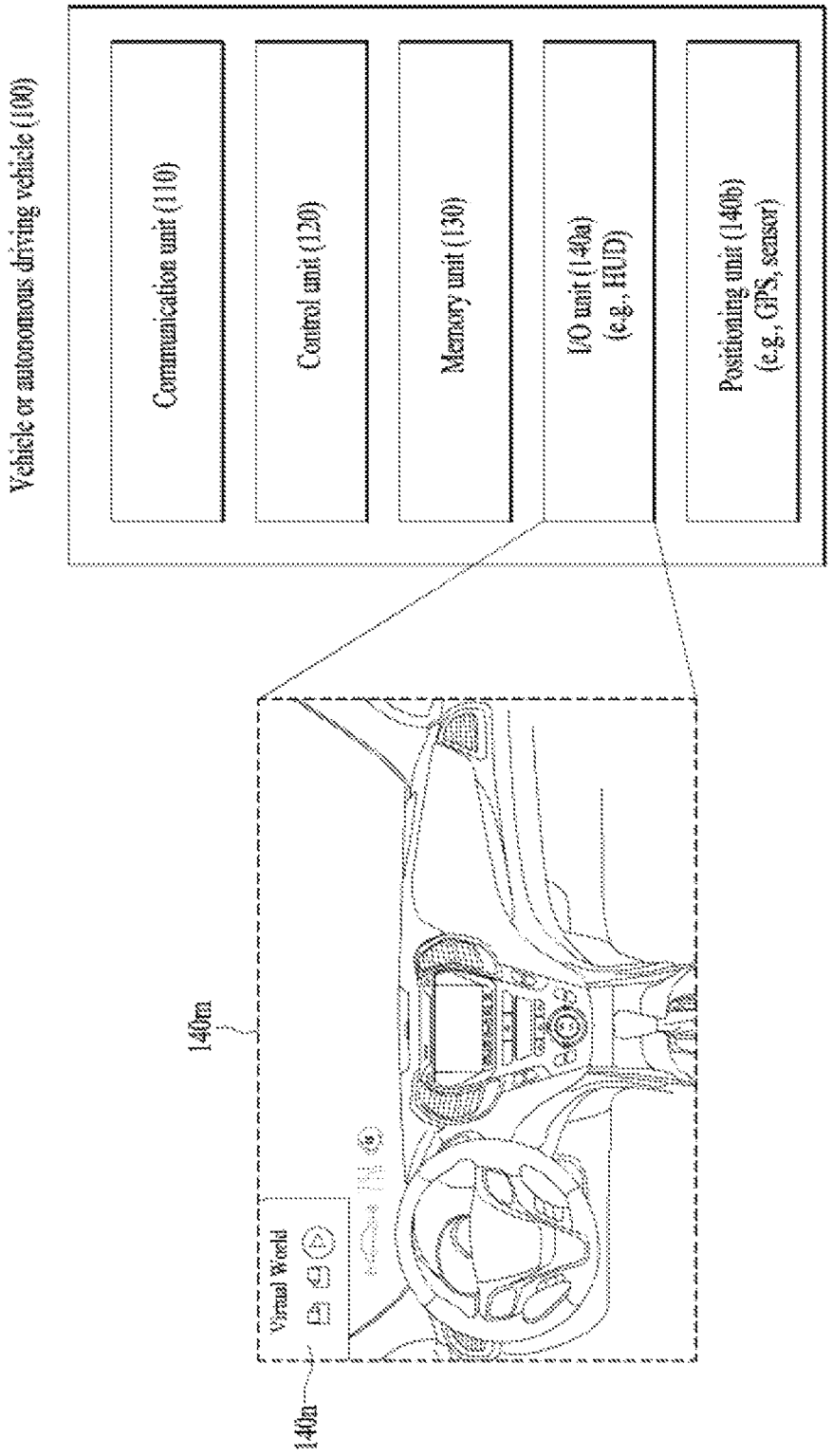

FIG. 17 illustrates a vehicle applied to the present disclosure. The vehicle may be implemented as a transport means, an aerial vehicle, a ship, etc.

Referring to FIG. 17, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 18:
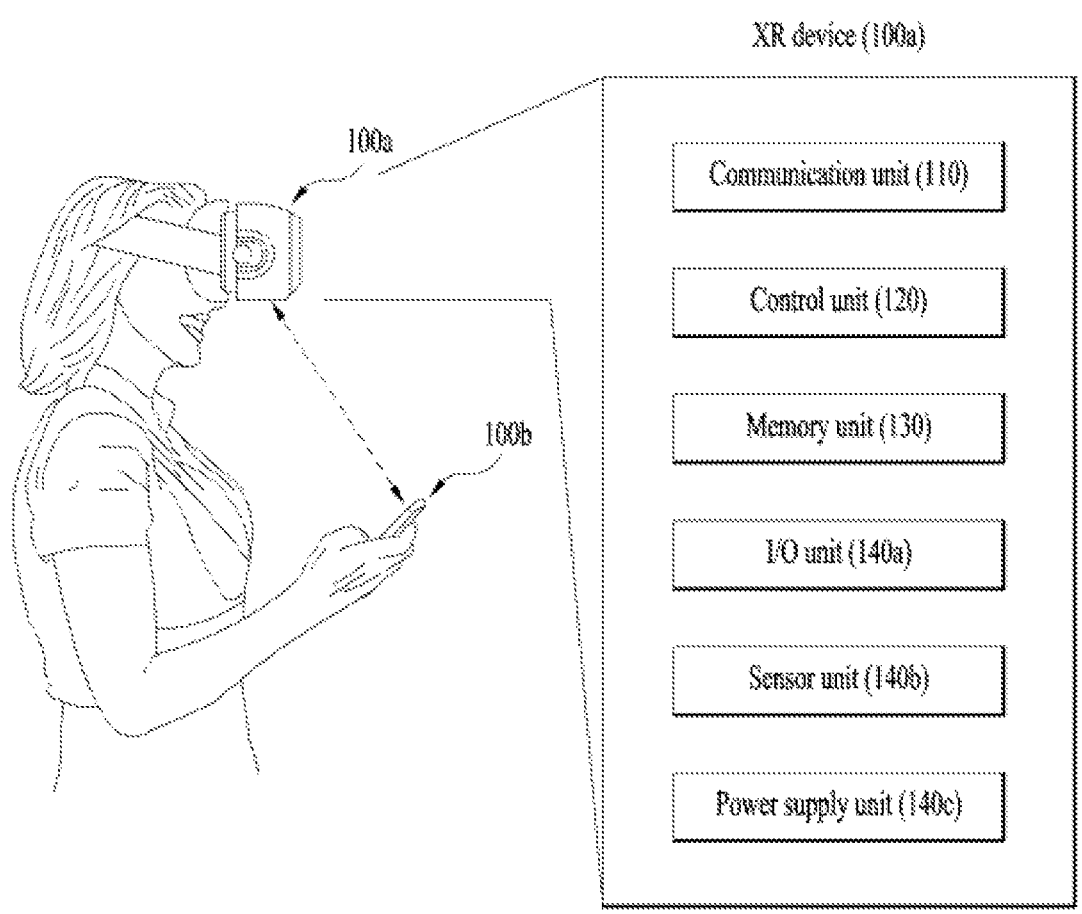

FIG. 18 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 18, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a handheld device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 19:
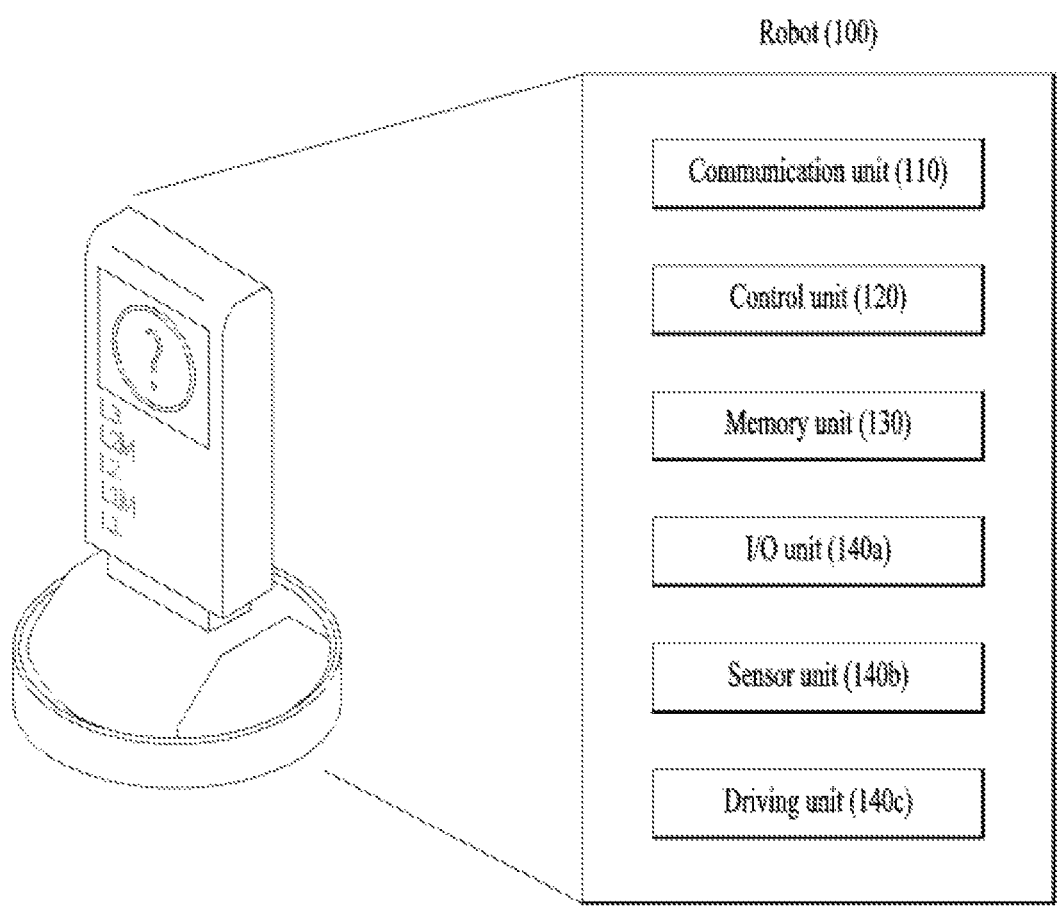

FIG. 19 illustrates a robot applied to the present disclosure. The robot may be categorized into an industrial robot, a medical robot, a household robot, a military robot, etc., according to a used purpose or field.

Referring to FIG. 19, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 15, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device to Which the Present Disclosure is Applied.

Figure 20:
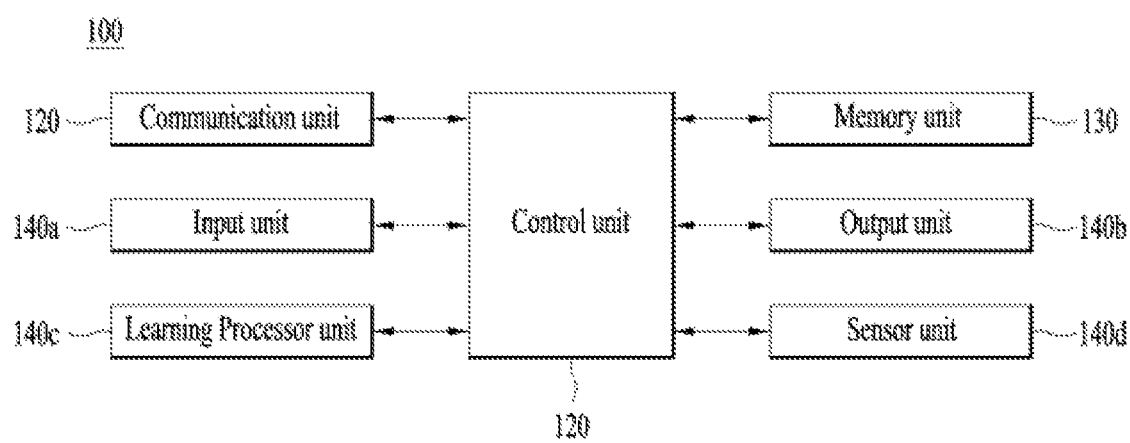

FIG. 20 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 20, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 15, respectively.

The communication unit 110 may transmit and receive wired/radio signals (e.g., sensor information, user input, learning models, or control signals) to and from external devices such as other AI devices (e.g., 100*x*, 200, or 400 of FIG. 14) or an AI server (e.g., 400 of FIG. 14) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 14). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 14). The learning processor unit 140*c* may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. An operation method of a user equipment (UE) related to sidelink discovery in a wireless communication system, the method comprising:
obtaining, by the UE, a sidelink discovery message; and
transmitting, by the UE, the sidelink discovery message;
wherein the sidelink discovery message is delivered to a MAC (Medium Access Control) layer using a logical channel (LCH) for sidelink discovery,
wherein the LCH for sidelink discovery has a fixed LCID (Logical Channel Identity) and a fixed priority, and
wherein the sidelink discovery message is transmitted based on the fixed LCID and the fixed priority.

2. The method of claim 1, wherein the fixed priority has a constant value regardless of whether the UE is a relay UE or a remote UE, a change in a service type, a change in a congestion level, and a change in a zone.

3. The method of claim 1, wherein the sidelink discovery message is not multiplexed with data for a different service or a different channel, except for data related to a radio resource control (RRC) connection.

4. The method of claim 1, wherein a pre-emption priority threshold of the sidelink discovery message has a unique value.

5. The method of claim 1, wherein the UE is configured to request a remote UE to exclude a resource region related to reception of the sidelink discovery message from candidate transmission resources.

6. The method of claim 5, wherein the sidelink discovery message is a response to a solicitation discovery message received from a remote UE.

7. The method of claim 1, wherein sidelink control information (SCI) transmitted by the UE includes a sidelink discovery message indicator indicating that a MAC protocol data unit (PDU) is related to the sidelink discovery message.

8. The method of claim 7, wherein the sidelink discovery message indicator includes information indicating that the message is to discover a relay UE.

9. The method of claim 8, wherein the information is 2-bit information indicating that the sidelink discovery message indicator is any one of a Model A discovery message, a Model B solicitation message, and a Model B discovery message.

10. A relay User Equipment (UE) configured to operate in a wireless communication system, the UE comprising:
at least one processor; and
at least one computer memory operatively connected to the at least one processor and configured to store instructions for causing the at least one processor to perform operations when being executed,
wherein the operations include:
obtaining, by the UE, a sidelink discovery message; and
transmitting, by the UE, the sidelink discovery message;
wherein the sidelink discovery message is delivered to a MAC (Medium Access Control) layer using a logical channel (LCH),
wherein the LCH for sidelink discovery has a fixed LCID (Logical Channel Identity) and a fixed priority, and
wherein the sidelink discovery message is transmitted based on the fixed LCID and the fixed priority.

11. The UE of claim 10, wherein the UE is configured to communicate with at least one of another UE, a UE related to an autonomous vehicle, a base station, or a network.

12. A processing device configured to control a user equipment (UE) to operate in a wireless communication system, the processing device comprising:
at least one processor; and
at least one memory operatively connected to the at least one processor and storing at least one instructions that, when executed by the at least one processor, causes the at least one processor to perform operations comprising:
obtaining, by the UE, a sidelink discovery message; and
transmitting, by the UE, the sidelink discovery message;
wherein the sidelink discovery message is delivered to a MAC (Medium Access Control) layer using a logical channel (LCH),
wherein the LCH for sidelink discovery has a fixed LCID (Logical Channel Identity) and a fixed priority, and
wherein the sidelink discovery message is transmitted based on the fixed LCID and the fixed priority.

13. A non-volatile computer-readable storage medium for storing at least one computer program including an instruction for causing at least one processor to perform operations for a user equipment (UE) when being executed by the at least one processor, the operations comprising:
obtaining, by the UE, a sidelink discovery message; and
transmitting, by the UE, the sidelink discovery message;
wherein the sidelink discovery message is delivered to a MAC (Medium Access Control) layer using a logical channel (LCH),
wherein the LCH for sidelink discovery has a fixed LCID (Logical Channel Identity) and a fixed priority, and
wherein the sidelink discovery message is transmitted based on the fixed LCID and the fixed priority.

* * * * *